United States Patent

Arai et al.

[11] Patent Number: 6,061,579
[45] Date of Patent: May 9, 2000

[54] HAND-HELD MOBILE PHONE TERMINAL

[75] Inventors: Hiroyuki Arai, Yokohama; Hitoshi Hoshino, Tokyo; Yuichi Otsu, Tokyo; Takashi Miyoshi, Tokyo, all of Japan

[73] Assignee: Advanced Space Communications Research Laboratory, Tokyo, Japan

[21] Appl. No.: 08/881,516

[22] Filed: Jun. 24, 1997

[30] Foreign Application Priority Data

Sep. 6, 1996 [JP] Japan ................................. 8-255299

[51] Int. Cl.⁷ .................................................. H04B 1/38
[52] U.S. Cl. ........................... 455/575; 455/347; 455/348
[58] Field of Search .................................... 455/347, 348, 455/349, 350, 351, 575

[56] References Cited

U.S. PATENT DOCUMENTS

| | | |
|---|---|---|
| 5,252,985 | 10/1993 | Christinsin . |
| 5,337,061 | 8/1994 | Pye et al. ................................. 343/702 |
| 5,392,054 | 2/1995 | Bottomley et al. . |
| 5,448,110 | 9/1995 | Tuttle et al. ............................. 257/723 |
| 5,508,709 | 4/1996 | Krentz et al. ........................... 343/702 |
| 5,513,383 | 4/1996 | Tsao ........................................ 455/575 |
| 5,535,435 | 7/1996 | Balzano et al. . |
| 5,572,223 | 11/1996 | Phillips et al. ........................... 343/702 |
| 5,613,224 | 3/1997 | Auvray ..................................... 455/575 |
| 5,628,049 | 5/1997 | Suemitsu ................................ 455/11.1 |
| 5,752,204 | 5/1998 | Epperson et al. ........................ 455/575 |
| 5,809,403 | 9/1998 | McDonald, Jr. et al. ................. 455/90 |

FOREIGN PATENT DOCUMENTS

| | | |
|---|---|---|
| 0 644 607 A1 | 3/1995 | European Pat. Off. . |
| 686 539 A5 | 4/1996 | Switzerland . |

OTHER PUBLICATIONS

"Hand–Held Terminal Antennas for Personal Satellite Communications", J. E. Caballero et al., International Mobile Satellite Conference, Ottawa, IMSC '95, pp. 351–356.

Primary Examiner—William G. Trost
Assistant Examiner—Sonny Trinh
Attorney, Agent, or Firm—Frishauf, Holtz, Goodman, Langer & Chick, P.C.

[57] ABSTRACT

A hand-held satellite mobile phone terminal contains an antenna deployment element with a small antenna attached to the tip area of the antenna deployment element The antenna deployment element is usually folded and stored on the rear side surface of the body of the hand-held satellite mobile phone terminal, and is deployed to become vertical to the rear side surface of the hand-held satellite mobile phone terminal body when it is used. The antenna deployment element is attached to the body of the hand-held satellite mobile phone terminal through a rotational axis so that the small antenna attached to the antenna deployment element can be rotated after deployment in order for its plane to become parallel with the ground surface. Also, the hand-held satellite mobile phone terminal is usable both in a satellite communication system and in a terrestrial cellular communication system. For this purpose, the antenna deployment element, batteries and circuits for satellite communication are installed as one package, which can be folded and stored on the rear side surface of the body of the hand-held mobile phone terminal, and which can be removed freely so that it is replaced by another package having the same attachment size as the one package and containing only batteries, when the hand-held mobile phone terminal is used in a terrestrial mobile communication system.

8 Claims, 6 Drawing Sheets

WHEN THE SATELLITE PACK ANTENNA IS STORED

WHEN THE SATELLITE PACK ANTENNA IS USED AT THE LEFT SIDE OF THE HUMAN HEAD

3 POSITION OF THE ANTENNA DEPLOYMENT ELEMENT WHEN THE RIGHT HAND IS USED TO HOLD THE TERMINAL

4 POSITION OF THE ANTENNA DEPLOYMENT ELEMENT WHEN THE LEFT HAND IS USED TO HOLD THE TERMINAL

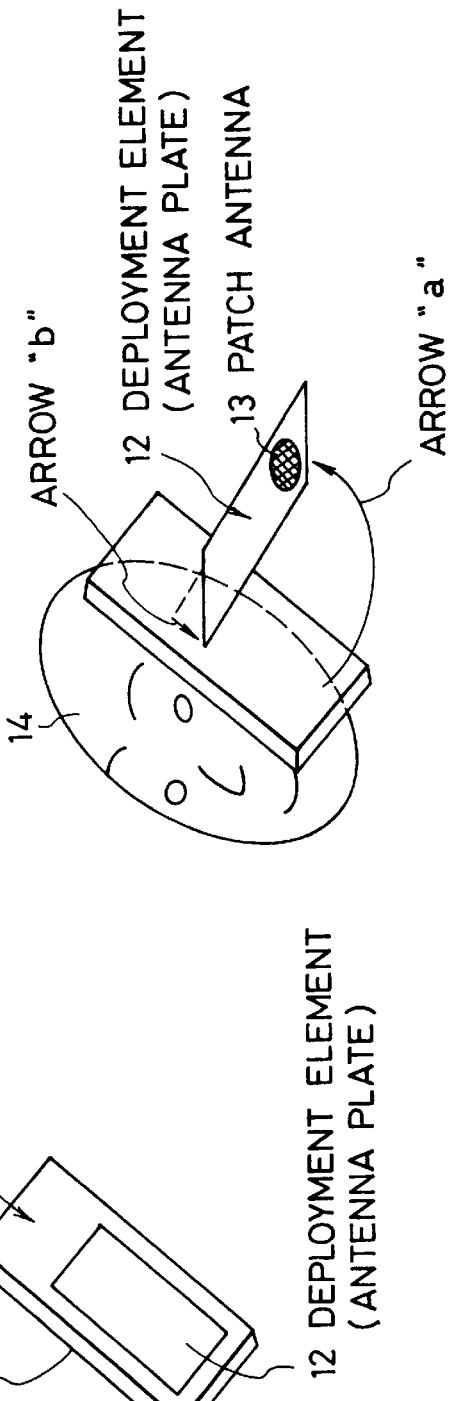
FIG. 4(b) WHEN THE ANTENNA IS USED AT THE LEFT SIDE OF THE HUMAN HEAD
FIG. 4(a) WHEN THE ANTENNA IS FOLDED AND STORED

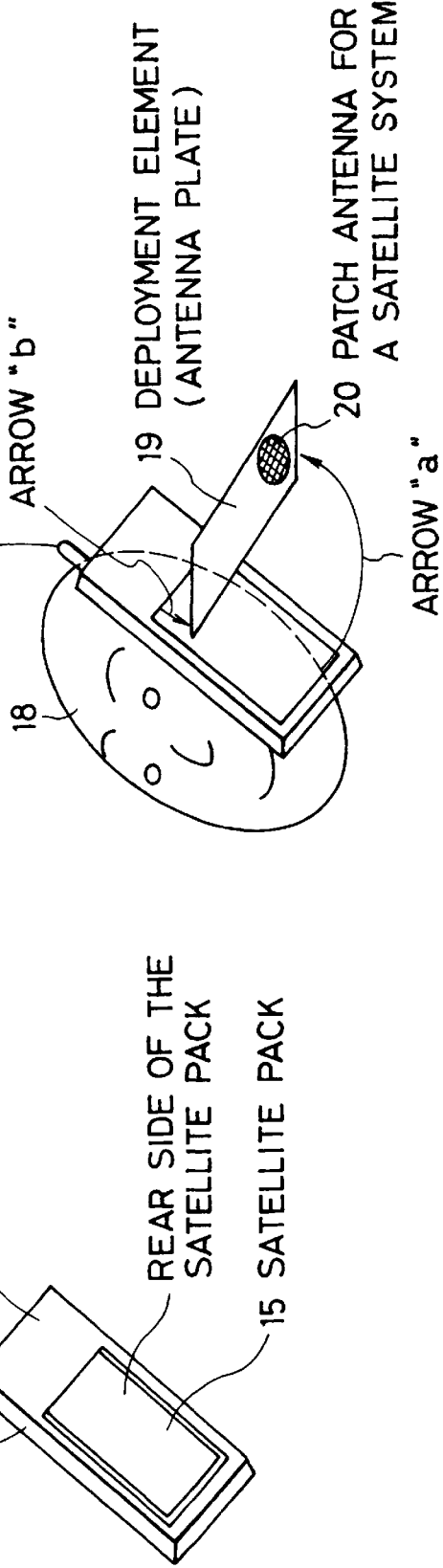

EMBODIMENT OF TM₂₁ MODE EXITATION

DIRECTIONALITY OF CONE BEAMS

HAND-HELD MOBILE PHONE TERMINAL

BACKGROUND OF THE INVENTION

This invention describes antenna deployment structures of a hand-held mobile phone terminal for a satellite mobile communication system, and a dual mode hand-held mobile phone terminal which can be used both for a satellite mobile communication system and for a terrestrial cellular mobile communication system.

DESCRIPTION OF THE PRIOR ART

The conventional antenna structure of a terrestrial cellular mobile phone terminal is described as follows: a whip antenna having a length of about one quarter wavelength is stored usually in the body of a hand-held terminal from upside, and is stretched out when it is in use for communication. Although the antenna gain is affected largely by the presence of human head for such an antenna structure, no serious problems such as communication interrupt will occur, because 20 dB or more link margin can be obtained from a larger field intensity with a shorter distance from a station than in a satellite system. Fading due to multiple paths may degrade communication quality, but this can be eased by using a diversity antenna system where a panel type inverse F antenna is attached to a different position than that of the whip antenna.

The conventional antenna structure of a satellite mobile phone terminal is described in the following: as the electromagnetic wave intensity at the ground surface is generally small in a satellite communication system due to the load limitation for a satellite, the antenna gain of terrestrial equipment must be large enough. Serious problems may arise, however, in increasing the antenna gain, in that the antenna gain and the axial ratio may be easily affected by the presence of the user's head.

Two conventional methods to avoid this difficulty are explained in a reference by J. E. Caballero, et Al., "Hand-held Terminal Antennas for Personal Satellite Communications", International Mobile Satellite Conference, Ottawa, IMSC'95, pp351–356. The antenna structure of the one method is illustrated in FIGS. 1(a) and 1(b), where a four-wire helical antenna 1 is attached on the tip of a bar-shaped deployable element 5 which can be rotated along the side surface of a mobile phone body 2. When the phone is held in a hand for use, the element should be fixed nearly vertical to the ground, with the antenna at a higher position than the user's head in order to avoid the influence from the user's body. The antenna is stored at one side of the phone body by rotating it when it is not in use. The antenna structure of the other method is shown in FIGS. 2(a) and 2(b), where two flat bars 7 at the each side of a phone body are deployed by rotating 180 degrees. A plate 6 with a patch antenna on it is attached near the tips of the flat bars. When the phone is used in a user's hand, the patch antenna plate is deployed by rotating 90 degrees so that the antenna plane becomes nearly in parallel with the ground surface. The antenna plate is attached aslant to the flat bars so that its surface faces to the sky when it is in use. In this structure also, the antenna is held at a higher position than the user's head.

Another conventional antenna structure which is used for one of satellite mobile phone systems, Iridium System, is illustrated in FIG. 3, where a bar antenna is attached to an upper portion of a phone terminal body, and it is folded and stored at the side of the body when it is not used.

SUMMARY OF THE INVENTION

As an antenna for a hand-held mobile phone terminal is generally used near the human body, gain and axial ratio of the antenna tend to become largely degraded by the influence of the human body, resulting in the communication quality degradation. Additionally, using an antenna near the human head is not favorable for guarding the human body from electromagnetic field influence.

Terrestrial electromagnetic field intensity of a signal from a satellite in a satellite mobile communication system is generally weak as compared to that of a terrestrial cellular mobile communication system, because of the satellite scale limitation due to the rocket ability or cost, and because of the long distance between the satellite and the ground. For this reason, and also for avoiding the influence from a human head on antenna sensitivity patterns, it is necessary to increase the gain of a mobile phone satellite antenna. This results in a larger and longer rod antenna which can exceed the height of the user's head. The necessity for accommodation of such an large antenna inevitably leads to a larger mobile phone body. A larger body means a heavier body, which tends to drop downwards while supported by a user's hand, to an inconvenient position.

A dual mode mobile phone terminal which can be applied both for a terrestrial cellular system and for a satellite system will be widely used in a mobile satellite communication system. Most of the users will usually employ the terrestrial system while they will use the satellite system as complementary. That is, for example, they will usually use the former system but will use the latter in a special case when they will go to mountains or an isolated island.

Such a dual mode mobile phone terminal inevitably becomes heavy, because even if it is used in a terrestrial cellular mobile system, it needs circuits and an antenna system for a satellite communication system, besides those for the terrestrial system.

It is an object of the invention to solve above mentioned problems through provision of novel methods enabling realization of a hand-held mobile phone terminal having an antenna structure which is light in weight, invulnerable to the influence of human head and harmless for human head.

The hand-held satellite mobile phone terminal of the invention is characterized in that it contains an antenna deployment element with a small antenna attached to the tip area of the said antenna deployment element, in that said antenna deployment element is usually folded and stored on the rear side surface of the body of said hand-held satellite mobile phone terminal, and in that said antenna deployment element is deployed to become perpendicular to the rear side surface of said hand-held satellite mobile phone terminal body when it is used.

Another characteristic of the invention is in that the antenna deployment element is attached to the body of the hand-held satellite mobile phone terminal through a rotational axis so that a small antenna attached to said antenna deployment element can be rotated after deployment for its plane to become parallel with the ground surface.

A further characteristic of the invention resides in that said hand-held satellite mobile phone terminal can be used as a dual mode hand-held mobile phone terminal which is usable both in a satellite communication system and in a terrestrial cellular communication system. Said antenna deployment element, batteries and circuits for satellite communication are installed as one package as a "satellite pack", are folded and stored on the rear side surface of the body of said hand-held mobile phone terminal, and can be removed freely so that it is replaced by another package, a "terrestrial pack", having the same attachment size as said satellite pack and containing only batteries, when said hand-held mobile phone terminal is used in a terrestrial mobile communication system.

A further characteristic of the invention is in that said small antenna is a thin flat patch antenna, said deployment element is flat panel shaped and said thin flat patch antenna can be attached to the tip. A thin flat patch antenna is mounted on the tip of an antenna plate (a deployment element) which is folded and stored on the rear side surface of the satellite pack of a dual mode mobile phone terminal, or on the rear side surface of the body of a mobile phone terminal only for satellite communication. When the mobile phone terminal is in use, the deployment element is first deployed up to 90 degrees from its stored position, then said deployment element is rotated, considering the slant angle of said mobile phone terminal to the ground surface, in order that the antenna plane of said patch antenna attached to said deployment element can become parallel with the ground surface.

BRIEF DESCRIPTION OF THE DRAWINGS

FIGS. 4(a) and 4(b) show a preferred embodiment of antenna deployment structures for a hand-held mobile phone terminal of the invention.

FIGS. 5(a) and 5(b) depict a preferred embodiment of structures for a dual mode hand-held mobile phone terminal of the invention.

DESCRIPTION OF THE PREFERRED EMBODIMENT

Figure 1B:
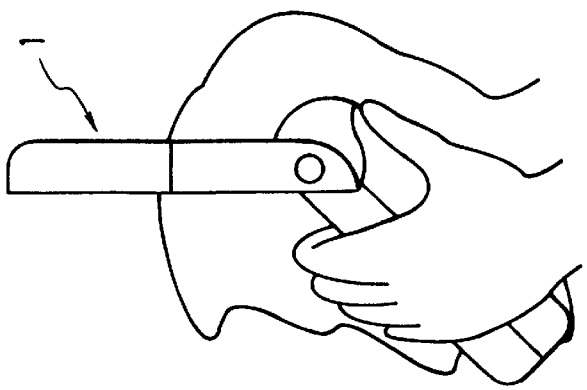
FIGS. 1(a) and 1(b) describe a structure example of the antenna portion of a conventional hand-held mobile phone terminal for a mobile satellite communication system.
Figure 1A:
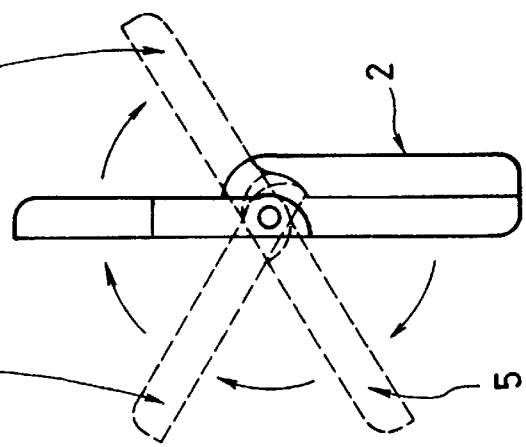
Figure 2B:
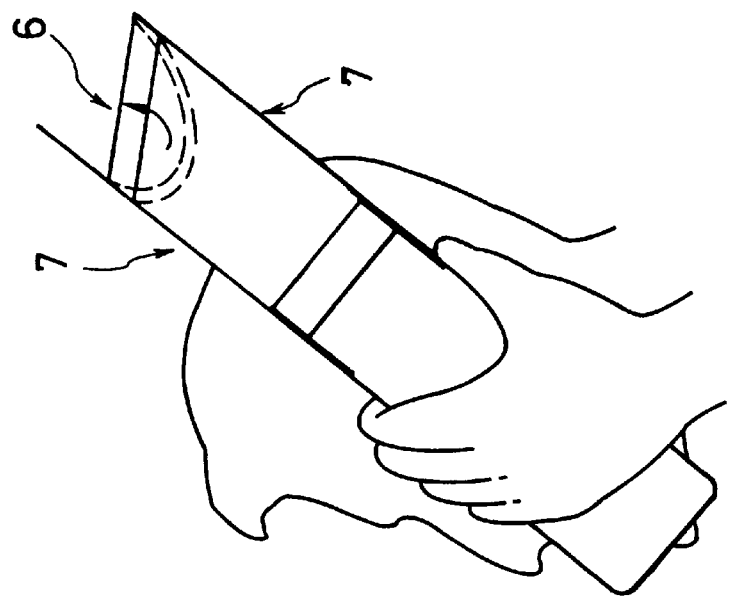
FIGS. 2(a) and 2(b) describe another structure example of a conventional hand-held mobile phone terminal for a mobile satellite communication system.
Figure 2A:
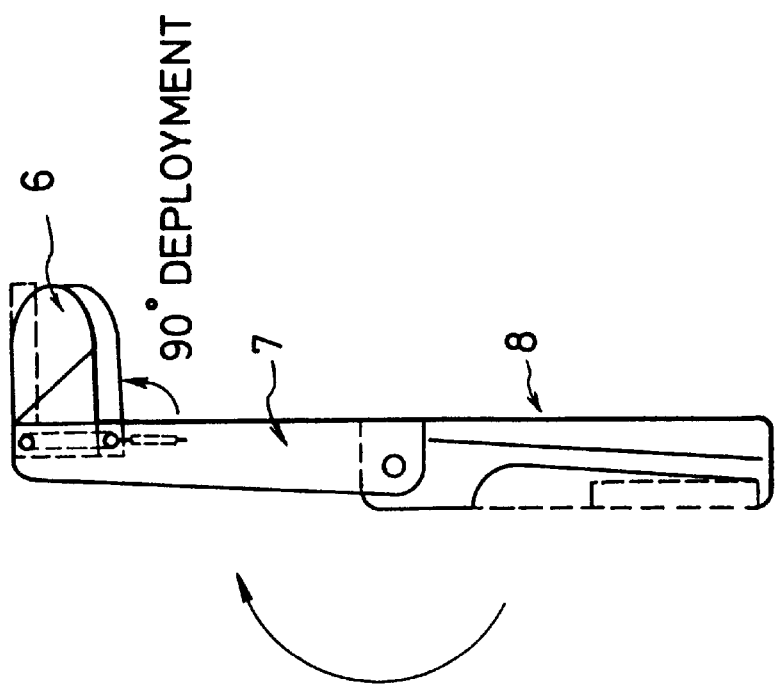
Figure 3:
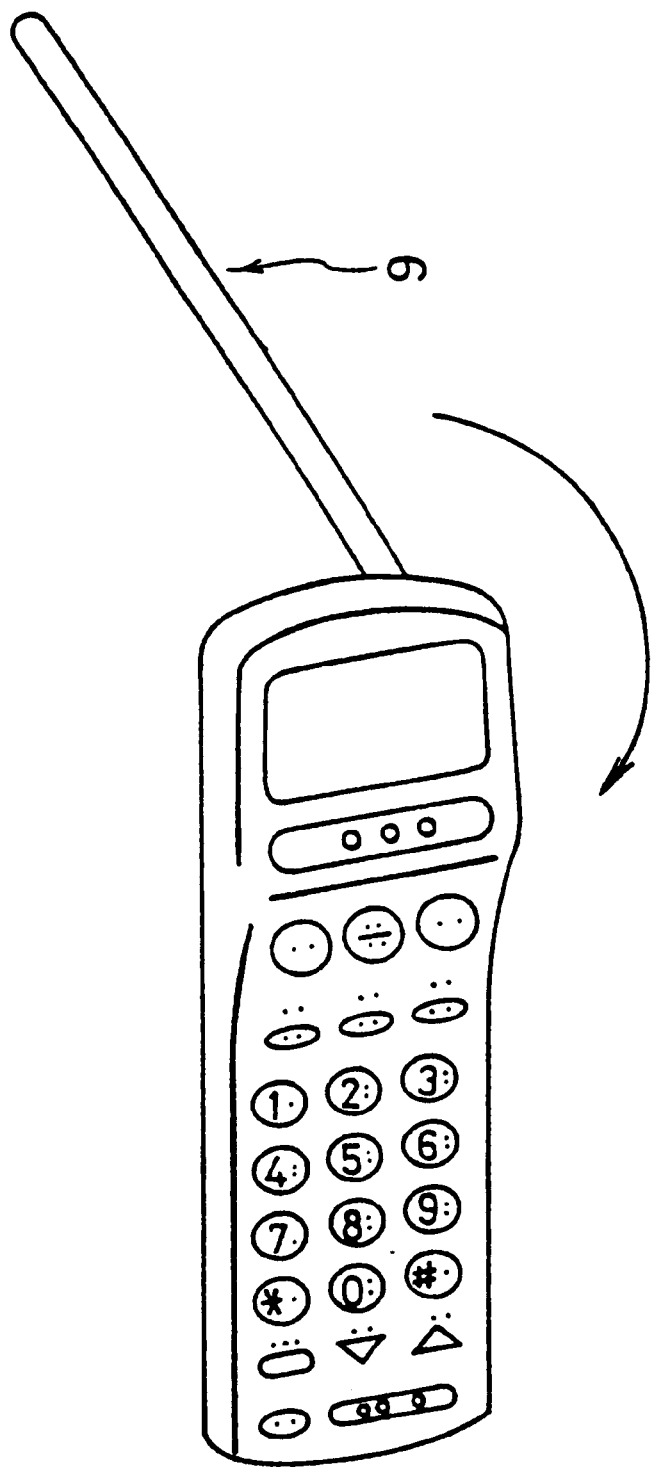
FIG. 3 is also another structure example of a conventional hand-held mobile phone terminal for a mobile satellite communication system.

The preferred embodiment of the invention will be explained hereinafter referring to drawings FIGS. 4(a), 4(b), 5(a) and FIG. 5(b).

FIG. 4(a) shows a basic configuration of a hand-held mobile phone terminal of the invention for a satellite communication system. Said hand-held mobile phone terminal 10 in the figure is having at the rear side surface 11 of its body an antenna deployment element 12 which has a small patch antenna attached to its tip portion. Said deployment element 12 is usually folded and stored at the rear side surface 11 of said hand-held mobile phone terminal body, and when it is in use, it is deployed to become perpendicular to the rear side surface 11 of the body of said hand-held mobile phone terminal 10, as is shown by the arrow "a" in FIG. 4(b). Said antenna deployment element 12 comprises, as is shown in FIG. 4(b), a small thin patch antenna 13, a panel which supports said patch antenna 13 and a power feeder portion although it is not shown in the figure. A human head is illustrated as 14 in FIG. 4(b).

The hand-held phone terminal is mostly used in a position where the angle between the longitudinal direction of the terminal body and a perpendicular direction is about 60 degrees. Consequently, said patch antenna 13 should be rotated at the rear side of the mobile phone terminal body in the direction shown by the arrow "b" in the FIG. 4(b), in order that the patch antenna faces the zenith. For this purpose, the folded and stored antenna which is shown in FIG. 4(a) is deployed before beginning satellite communication, according to the sequence described below.

First, the deployment element 12 is deployed in the direction shown by the arrow "a" in FIG. 4(b), in order that it becomes perpendicular to the rear side surface 11 of said hand-held mobile phone terminal body. Then, the deployed deployment element is rotated several tens of degrees around its longitudinal axis and is fixed at that position, considering the slant angle of said mobile phone terminal body to the ground surface, in order that the plane of said deployment element becomes parallel with the ground surface. The rotation of the deployment element and the fixing of its position in parallel with the ground surface should be triggered through pushing a button by a finger of the user's hand which holds the hand-held mobile phone terminal. It is preferable that the rotation and fixing structure is such that the plane of the deployment element becomes parallel with the ground surface regardless of which side of the user's head the hand-held mobile phone terminal is on. By attaching the antenna at an appropriate tip position of the deployment element, it is possible for the antenna not to be affected by the presence of the user's head.

FIGS. 5(a) and 5(b) show a preferable embodiment example of the invention applied to a dual mode hand-held mobile phone terminal for a satellite mobile communication system. If the mobile phone terminal of the invention is used in a satellite communication system, said mobile phone terminal comprises a main body which has the same function as a conventional terrestrial cellular mobile phone terminal from which a battery portion is removed, and a satellite pack which is attached to the portion of the main body from where the battery portion was removed, as FIG. 5(a) shows. The satellite pack has an attachment surface size which is the same as that of a terrestrial pack which contains only batteries for use in a terrestrial communication system. The two packs can be replaced by each other according to the application purpose. The satellite pack includes batteries, satellite communication circuits and an antenna for satellite communication. The deployment element 19 which is attached to the satellite pack has a similar structure as the one illustrated in FIGS. 4(a) and 4(b), comprising a deployment element 19 stuff which supports an antenna (an antenna plate), a thin flat patch antenna 20 and a power feeding portion which is not shown in the figure.

Deployment procedure for this embodiment example is similar as is illustrated in FIG. 4(b). That is, before beginning satellite communication, the folded and stored antenna is deployed according to the procedure described in the following.

First, the deployment element 19 is deployed in the direction shown by the arrow "a" in FIG. 5(b), in order that it becomes vertical to the rear side surface of the hand-held mobile phone terminal body. Then, the deployed deployment element 19 is rotated several tens of degrees around its longitudinal axis and is fixed at that position as shown in FIG. 5(b), considering the slant angle of said mobile phone terminal body to the ground surface so that the plane of said deployment element is parallel with the ground surface.

Figure 6B:
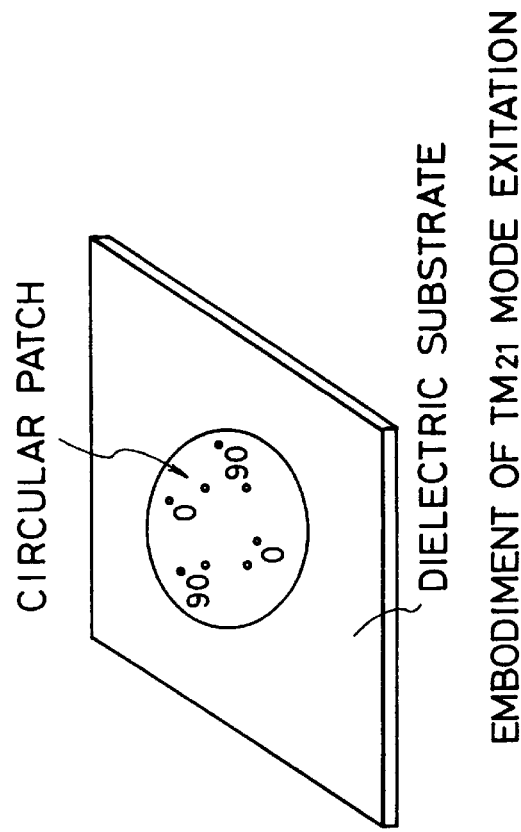
FIGS. 6(a) and 6(b) describe a preferreed embodiment of antenna directionality and antenna excitation pattern for a patch antenna suitable for satellite communication using a geostationary satellite.
Figure 6A:
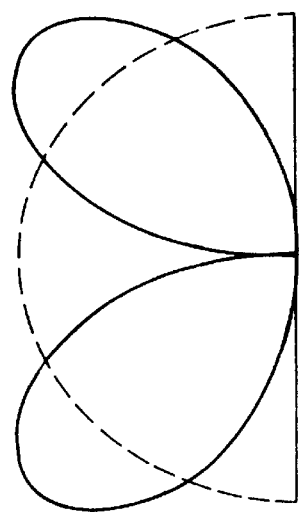

The hand-held mobile phone terminal of the invention that -has the structure stated above can be used for both a geostationary and a geocirculating satellite communication system. Especially in a geostationary system, the antenna gain can be enhanced by using a conical beam as illustrated in FIG. 6(a). For example, when the satellite orbit position is on 140 degrees of east longitude and the service area is assumed to cover the whole Japan islands, the elevation angle to look up to the satellite from the ground is about between 36 degrees and 60 degrees. Considering that the antenna can be fixed to be in parallel with the ground, a patch antenna for circular polarization which has a directionality characteristic so-called as cone beams is more suitable than ordinary type antennas of which gain becomes maximum in the zenith direction. The cone beam directionality as illustrated in FIG. 6 (a) can be easily realized by exciting $TM_{21}$ or $TM_{11}$ mode for a circular patch antenna. FIG. 6(b) shows an example of $TM_{21}$ mode excitation.

For a hand-held mobile phone terminal which is used only for a satellite communication system without any need for connection to a terrestrial cellular communication system, it is more suitable to implement an antenna deployment structure similar to the one which is attached to the rear side of the satellite pack, on the rear side of the hand-held mobile phone terminal body, than to use the removable satellite pack. If a user wants to use usually only the terrestrial cellular communication system, the satellite pack can be removed and replaced by the original battery pack (terrestrial pack), so as to reduce the weight of the terminal. Antenna structure for terrestrial communication can be the same as the conventional one.

As the deployment element of the invention is deployed to be stretched out aside at the rear side of the hand-held mobile phone terminal body and the patch antenna is attached at the tip of the deployment element, said patch antenna is deployed accordingly to be spaced from the user's head. Because of this particular antenna structure, degradation in antenna gain or axial ratio can be kept very small and the effect of electromagnetic field can be reduced to protect the human body, as compared to conventional structures wherein an antenna is used near the human head.

In addition to the above, the size of the mobile phone terminal of the invention when the antenna is folded and stored can be made smaller than conventional ones which use a bar shaped antenna, because the deployment element of the invention is panel shaped and the antenna attached to it is a thin flat patch type. Also, by using a hand to support the mobile phone terminal body at the deployment element joint, it becomes easier for a user to prevent the mobile phone terminal slipping down by its own weight.

When the mobile phone terminal of this invention is used as a dual mode mobile phone terminal and if it is usually used only in a terrestrial mobile phone system, the weight of the terminal can be greatly reduced by replacing the satellite pack with the terrestrial pack which only includes batteries. Weight of unnecessary circuits for satellite communication and the antenna can be excluded by this replacement, which is quite important for a practical hand-held terminal.

What are claimed are:

1. A hand-held satellite mobile phone terminal comprising an antenna deployment element having an antenna attached to a distal tip area thereof, said antenna deployment element being movable between a first position where it is folded and stored on a rear side surface of said hand-held satellite mobile phone terminal, and a second position where it is deployed perpendicular with respect to the rear side surface of said hand-held satellite mobile phone terminal body when in use;

wherein said phone terminal is a dual mode type terminal which is usable both in a satellite communication system and in a terrestrial cellular communication system, said phone terminal having a first package removably coupled to said rear side surface thereof, said package including said antenna deployment element, batteries and circuits for satellite communication installed as one unit, said package being replaceable by a second package, including only batteries, having the same attachment size as said first package.

2. A hand-held satellite mobile phone terminal comprising an antenna deployment element which is a one-piece component having an antenna attached to a distal tip area thereof, said antenna deployment element being movable between a first position where it is folded and stored on a rear side surface of said hand-held satellite mobile phone terminal, and a second position where it is deployed perpendicular with respect to the rear side surface of said hand-held satellite mobile phone terminal body when in use, and said antenna deployment element being rotatably attached to the rear side surface of the body of said hand-held satellite mobile phone terminal so that said antenna deployment element is rotatable around its longitudinal axis after deployment to said second position such that a plane of the antenna is parallel with the ground surface.

3. A hand-held satellite mobile phone terminal comprising an antenna deployment element having an antenna attached to a distal tip area thereof, said antenna deployment element being movable between a first position where it is folded and stored on a rear side surface of said hand-held satellite mobile phone terminal, and a second position where it is deployed perpendicular with respect to the rear side surface of said hand-held satellite mobile phone terminal body when in use, and said antenna deployment element being rotatably attached to the rear side surface of the body of said hand-held satellite mobile phone terminal so that said antenna deployment element is rotatable around its longitudinal axis after deployment to said second position such that a plane of the antenna is parallel with the ground surface;

wherein said phone terminal is a dual mode type terminal which is usable both in a satellite communication system and in a terrestrial cellular communication system, said phone terminal having a first package removably coupled to said rear side surface thereof, said package including said antenna deployment element, batteries and circuits for satellite communication installed as one unit, said package being replaceable by a second package, including only batteries, having the same attachment size as said first package.

4. A hand-held mobile phone terminal as claimed in claim 1 wherein said antenna is a patch antenna.

5. A hand-held mobile phone terminal as claimed in claim 2 wherein said antenna is a patch antenna.

6. A hand-held mobile phone terminal as claimed in claim 1 wherein said antenna is a patch antenna.

7. A hand-held mobile phone terminal as claimed in claim 3 wherein said antenna is a patch antenna.

8. A hand-held satellite mobile phone terminal having an elongated body with a front side surface, adapted to be placed next to a user's face, and a rear side surface, comprising:

an elongated antenna deployment element which is a one-piece component having first and second opposite ends and being rotatably coupled to said rear side surface by only a single hingedly-connected portion which is at said first end; and an antenna mounted on said antenna deployment element at said second end of said antenna deployment element;

wherein when in use to deploy said antenna, said antenna deployment element is rotated at said single hingedly-connected portion about said at least one point such that a longitudinal axis of said antenna deployment element is perpendicular with respect to a longitudinal axis of said body.

* * * * *